June 7, 1966   R. N. ROLEY   3,254,610
RAILWAY CAR TRUCK
Filed Dec. 27, 1963
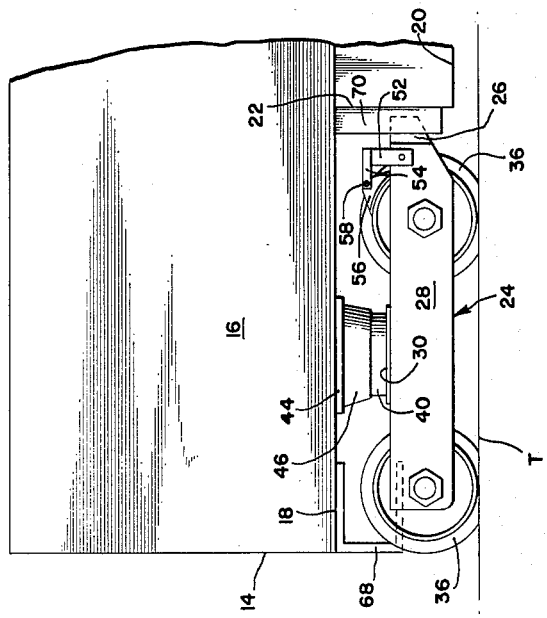
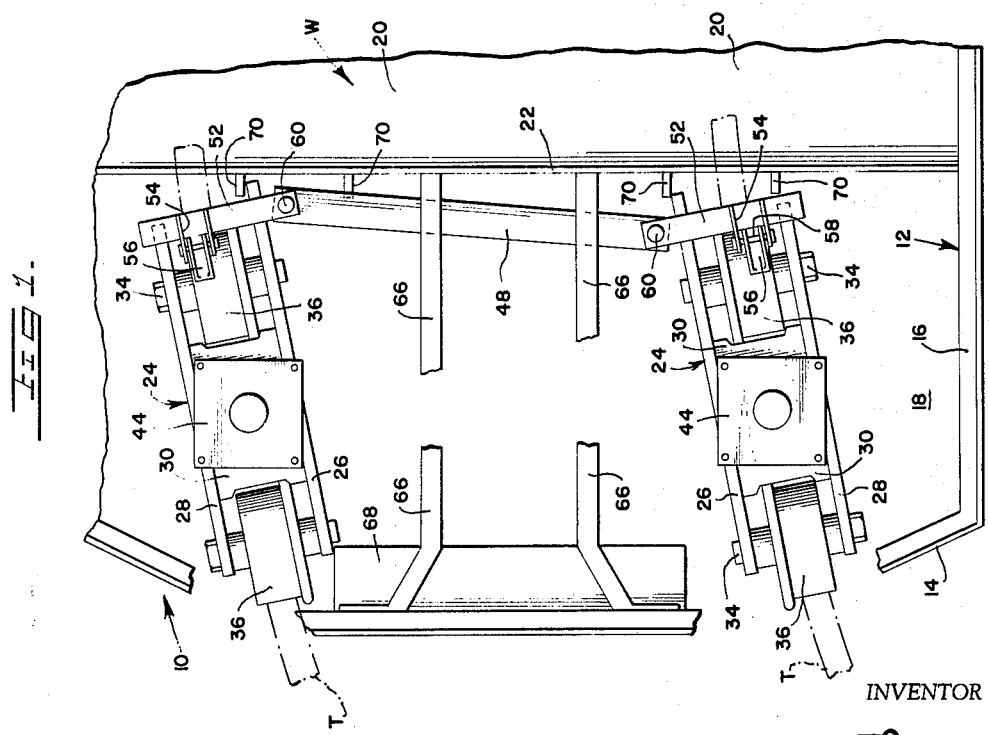
INVENTOR
BY Robert Neel Roley

United States Patent Office 3,254,610
Patented June 7, 1966

3,254,610
RAILWAY CAR TRUCK
Robert Neel Roley, P.O. Box 1, Alexandria, Va.
Filed Dec. 27, 1963, Ser. No. 333,841
1 Claim. (Cl. 105—179)

More particularly, the present invention pertains to a load carrying vehicle of the track-following type which is provided with independently mounted wheel trucks having a limited turning movement on curlilinear portions in the tracks.

It is a primary object of this invention to provide a load carrying vehicle for travel on tracks which can safely negotiate sharp radius curvilinear portions while traveling at comparatively high velocities over the tracks.

It is another primary object of the present invention to provide a load carrying, track-following vehicle having independently mounted wheel trucks at each end thereof which are so connected and arranged as to have the same turning movement about their respective vertical mounting axes.

A further primary object of the present invention is to provide such a load carrying vehicle having independently mounted wheel trucks wherein damage is prevented to the connection between the wheel trucks at each end of the vehicle when the vehicle encounters small radii curvilinear portions in the tracks.

A still further primary object of this invention is to provide such a load carrying vehicle wherein the turning movement of the wheel trucks about their respective vertical mounting axes is limited to prevent the derailment of the vehicle on a curvilinear portion if there is a break in the connection between adjacent wheel trucks and to facilitate the re-railing of the vehicle in the event of a derailment.

Furthermore, still another primary object of the present invention is to provide a load carrying, track-following vehicle wherein the turning movement of the independently mounted wheel trucks thereof is limited by means so constructed, arranged and mounted on the vehicle as to resist shocks thereto when the vehicle encounters small radii curvilinear portions in the tracks.

Other objects and important features of the invention will be apparent from a study of the specification following taken with the drawing, which together show, illustrate, described and disclose a preferred embodiment or modification of the invention and what is now considered to be the best mode of practicing the principles thereof. Other embodiments or modifications may be suggested to those having the benefit of the teachings herein, and such other embodiments of modifications are intended to be reserved especially as they fall within the scope and spirit of the subjoined claims.

In the drawing:

FIGURE 1 is a plan view of one end of a load carrying vehicle constructed according to the principles of the present invention, with parts broken away; and FIGURE 2 is a side elevational view of the apparatus shown in FIGURE 1, with parts broken away and parts in section.

Referring now to the drawing, there is illustrated therein a load carrying vehicle 10 of the track-following type, such as a mine car, having a body 12 preferably constructed of metal plates of generally rectangular shape, and which are connected by welding or riveting to provide an unusually rigid body structure. The vehicle body 12 comprises a plate 14 at each end thereof to which is rigidly attached a pair of parallel side plates 16. A heavy base plate 18 extends between the side plates 16 adjacent each end of the vehicle body 12, and plates 20 having generally upwardly curved side edge portions fixedly structurally associated with or connected to the side plates 16 are disposed between the base plates 18. The plates 20 define a well W and are connected at both ends to the heavy base plates 18 by generally vertical or upstandingly extending plates 22 which form the ends of the well W.

The vehicle body 12 is supported by two independently mounted wheel trucks 24 disposed at each end of the body. Each of the wheel trucks 24 is substantially identical in construction and comprises a pair of parallel inner and outer side frames 26, 28, respectively, which are formed of heavy base plate. The inner frame 26 of each of the wheel trucks 24 is of greater longitudinal dimensional extent than the outer side frame 28, and the end of each side frame 26 adjacent the well W is disposed closer to the adjacent upstanding plate 22 than the corresponding end of the outer side frame 28, for a reason to be described hereinafter. The side frames 26, 28 are fixedly structurally associated or secured together by transverse angle plates 30 and a curved gimbal supporting plate 32 (see FIGURE 2) which preferably are welded together and to the side frames 26, 28 to form an unusually rigid wheel frame. Extending between and rigidly mounted on the side frames 26, 28 are wheel axles or spindles 34 on which are rotatably mounted flanged wheels 36 that are particularly adapted to be received on tracks T shown in phantom in FIGURE 1.

With particular reference to FIGURE 2, a body supporting member or gimbal 38 is mounted on the gimbal supporting member 32, and a sleeve 40 is mounted within and extends above the gimbal 38. Slidably mounted within and extending above the sleeve 40 is a king post 42 which is rigidly attached at its upper end to a plate 44, which, in turn, is rigidly connected by welding or otherwise to the adjacent heavy base plate 18. A dust guard 46 may depend from the plate 44 and extends over the king post 42 and the sleeve 40. Resilient means such as a coil spring or springs are mounted within the gimbal 38 for mutual cooperative engagement with the end plate 18 in a conventional manner, as shown in the United States patent to Flowers 2,602,401. With this type of a vehicle body mounting, it will be readily understood that the wheel trucks 24 may swing or turn about a vertical axis when passing around curves; they may oscillate in a vertical plane when traveling over uneven tracks; and the vehicle body 12 may move vertically under spring control relative to the wheel trucks 24.

As hereinbefore noted, the wheels 36 are in tandom on each truck 24 and are flanged so that the front wheel 36 of the outside truck 24, when following a curved track T (leading to the left as shown in FIGURE 1), turns the truck 24 about a vertical axis so that is follows the curved track T. The opposed trucks 24 at each end of the vehicle body 12 are connected by a tie bar 48 in a manner disclosed in the above mentioned patent to Flowers, and hereinafter briefly described, so that the turning movement of one truck 24 about a vertical axis is imparted to the opposed truck.

The depending members 50 (FIGURE 2) of a bracket 52 are pivotally mounted on pins 53 on the side frames 26 and 28 of each of the wheel trucks 24. The bracket 52 has parallel spaced arms 54 rigidly attached thereto which carry a brake shoe 56 that is pivotally mounted on a bolt 58 extending through the arms 54. The tie bar 48 is pivotally connected at each end to the adjacent brake shoe bracket 52 by a pivot pin 60 (FIGURE 1). It will be readily understood that there is provided a universal connection between the tie bar 48 and each brake shoe bracket 52 which enables the tie bar 48 to move endwise and thus impart the movements of one truck 24 to the opposing truck without interfering with the independent movements of the trucks 24 in vertical planes.

This universal connection also permits the tie bar 48 to be oscillated or twisted for swinging the brake shoe bracket 52 on its pivotal support to thus move the brake shoes 56 into and out of engagement with the wheels 36. In order to twist the tie bar 48, a cantiliver swivel pin 62 is located in the tie bar adjacent one end thereof and is connected to a link 64 which, in turn, is connected to a suitable brake actuating mechanism (not shown) such as that disclosed in the United States patent to Flowers (2,461,263). It is noted that the braking mechanism for the trucks 24 at the rear end of the vehicle body 12 is substantially identical to that which has been described above in connection with the trucks 24 at the front end of the body 12.

The tie bar 48 is disposed closely adjacent the vertical plate 22 to leave ample space between the well W and the end of the vehicle body 12 for a coupling mechanism (not shown) of any suitable or conventional construction which may be mounted between sill members 66 rigidly mounted on and extending between the vertical plate 22 and the plate 14 at the adjacent end of the body 12.

The turning movement of the wheel trucks 24 on their vertical axes is limited by a stop plate 68 rigidly mounted on the heavy base plate 18 and so disposed as to contact the inner side frame 26 of an adjacent wheel truck 24 when the wheel truck has turned inwardly a predetermined amount about its vertical axis (see FIGURE 1). Similarly, a pair of stop members or plates 70 are rigidly mounted on the upstanding plates 22 in perpendicular relationship thereto adjacent each of the wheel trucks 24. The stop members 70 extend transversely from their respective upstanding plate 22 a sufficient distance to contact the protruding end of the inner side frame 26 of the adjacent wheel truck 24 when the wheel truck turns inwardly or outwardly a predetermined distance about its vertical axis.

When the load carrying vehicle 10 is traveling around a curvilinear portion or curve to the left, as shown in FIGURE 1, the flange of the forward wheel 36 of the outside truck 24 engages the outer track T and guides the vehicle around the curve which may be of very short radius. This outside truck 24 is limited in its inward turning movement by the adjacent portion of the stop plate 68. The centrifugal force of the vehicle body 12 transmitted to the truck frame through the king post 42 forcing the flange of the rear wheel 36 of this outside truck 24 against the track T. The inner side frame 26 of each opposing truck 24, however, engages a stop member 70 of the adjacent pair thereof and the outward turning movement of the outside truck 24 is thus limited by the adjacent stop member 70 and, through the tie bar 48, by the stop member 70 in contact with the inner side frame 26 of the opposing or inner truck 24.

The pairs of stop members 70 are so positioned on the upstanding plate 22 at each end on the vehicle body 12 that each stop member 70 of one pair is spaced from the corresponding stop member 70 of the opposing pair a distance which is less than that between the longitudinal axes of opposing wheel trucks 24. The corresponding stop members 70 of opposing pairs, therefore, are so positioned to positively stop the turning movement of the opposing trucks 24, even though the angularity of the tie bar 48 on a curve may tend to pull the tie bar ends of the trucks closer together than the outer ends of the trucks. It is advantageous to positively stop the turning movement of each of the trucks 24 at the same time on a curve, since this reduces shocks on the tie bar 48 and prevents damage thereto. Also, this stopping feature serves to greatly reduce the tendency of the wheel trucks 24 to derail when there is a break in the tie bar connection between opposing trucks 24.

The pairs of stop members 70 on the upstanding plates 22 and the stop plates 68 on the heavy base plates 18 serve to transmit the extreme shocks from the tracks T on minimum radius curves to the plates of the vehicle body 12 upon which they are mounted. In addition, these stop members serve to limit the swinging or turning movement of the trucks 24 in the event of a derailment and thus facilitate the re-railing of the trucks. The provision of a pair of stop members 70 on the upstanding plate 22 adjacent each wheel truck 24 is particularly advantageous since only the inner side frame 26 of each truck is extended between the stop members 70 to limit the turning movement of the truck, with a resultant saving in material on the outer side frames 28 which need only be long enough to support the wheel axles 34 and the brake bracket 52.

Alternatively, instead of being mounted on the upstanding plates 22, the pairs of stop members 70 could be mounted on the heavy base plates 18 and extend downwardly therefrom a sufficient distance to engage the inner side frames 26 and thus limit the turning movement of the wheel trucks 24. This modified construction possesses the advantage of utilizing the very heavy base plates 18 to provide a rigid mounting for the stop members 70 and to absorb the shocks therefrom, thereby resulting in a reinforcement of the stop members 70.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claim here appended.

What I claim as my invention is:

A vehicle comprising:
 (a) an elongate load carrying body having a generally horizontally disposed base plate adjacent each end portion thereof,
 (b) a pair of wheel trucks secured to each of the base plates,
 (c) each of said wheel trucks being structurally operatively associated with the body to have independent turning movement with respect thereto about a generally vertically extending axis,
 (d) each of said wheel trucks comprising,
 (e) a pair of inner and outer side frames disposed in substantially parallel relationship relative to each other,
 (f) a pair of wheels rotatably mounted on and disposed between each pair of the side frames,
 (g) the inner and the outer side frames of each wheel truck being laterally spaced apart and extending generally longitudinally relative to the body of the vehicle with each of the inner side frames having a greater longitudinal extent than the outer side frames and extending generally longitudinally inwardly relative to the body and terminating beyond the wheels and the outer side frame which is associated therewith,
 (h) a generally laterally extending tie-bar connected between the inner side frames of each pair of the wheel trucks to enable the respective pair of wheel trucks to turn as a unit about the axes thereof,
 (i) a pair of stop members for each of the wheel trucks,
 (j) means mounting each pair of the stop members directly to the base plate of the body to which the associated wheel truck is secured at a location thereon which is adjacent the longitudinally inner end portion of the respective inner side frame with the stop members extending generally downwardly from the base plate and the longitudinally inner end portion of the associated inner side frame of the respective wheel truck being disposed intermediate the respective pair of stop members to enable the longitudinally inner end portion of the associated inner side frame to engage one of the respective stop members after a predetermined amount of turning movement to thereby limit the turning movement of the respective wheel truck, and (k) an elongate generally laterally extending stop plate carried by the base plate of the body at a location thereon which is longitudinally spaced from the stop members for engagement with the longitudinally outer end portions of the inner side frames of the wheel trucks to also limit the turning movement thereof in conjunction with the stop members.

References Cited by the Examiner

UNITED STATES PATENTS

| | | | |
|---|---|---|---|
| 2,377,768 | 6/1945 | Edgar | 105—179 |
| 2,414,726 | 1/1947 | Edgar et al. | 105—179 |
| 2,439,801 | 4/1948 | Flowers | 105—179 |
| 2,501,503 | 3/1950 | Flowers | 105—158 X |
| 2,602,401 | 7/1952 | Flowers | 105—199 X |
| 3,002,470 | 10/1961 | Flowers | 105—250 X |

ARTHUR L. LA POINT, *Primary Examiner.*

H. BELTRAN, *Assistant Examiner.*